Feb. 22, 1938. W. J. MacLEOD 2,109,428
CORE FOR TRIMMING MOLDINGS
Filed May 17, 1935
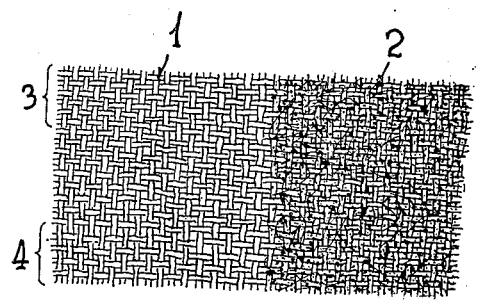
Fig. 1.
Fig. 5.
Fig. 2.
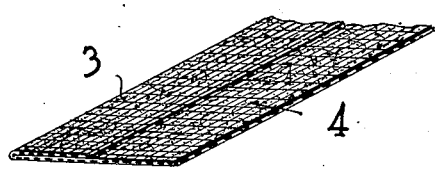
Fig. 6.
Fig. 3.
Fig. 4.
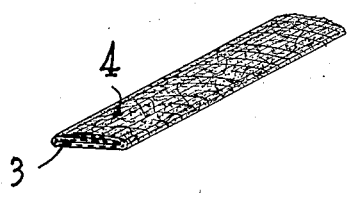
Inventor
William J. MacLeod
By Dyer + Kirchner
Attorneys Patented Feb. 22, 1938

2,109,428

UNITED STATES PATENT OFFICE 2,109,428

CORE FOR TRIMMING MOLDINGS

William John MacLeod, Lochmoor, Grosse Pointe Village, Mich., assignor to Backstay Welt Company, Union City, Ind., a corporation of Indiana Application May 17, 1935, Serial No. 22,103

6 Claims. (Cl. 154—43)

My invention relates to trimming moldings of the type extensively used in the furniture and automobile body industries, and is directed particularly to providing a novel, efficient and inexpensive core or filler element.

The trimming moldings of the type to which my invention relates comprise essentially a strip of fabric folded around one or more filler or core elements which give body and thickness to the structure. The molding generally comprises a welt, frequently of the blind nail type, which is tacked or otherwise applied over the meeting edges or one edge of an area of covering fabric, such as an upholstered seat covering material, or other automobile body fabric. In certain types of such trimmings it is desirable that the welt or molding have an appreciable body or thickness, to enhance the ornamental effect, and to render the trimming more durable and prevent it being readily disengaged from applied position.

Thickness and body are attained by incorporating in the folded fabric one or more cores or fillers, and it is to this element of the trimming molding that my invention relates. Heretofore various different mediums have been employed in fabricating trimming cores, including strips of leather, cords and roving of cotton, jute, and paper, and molded or extruded rubber. The structure provided by my present invention is superior to those heretofore known in that it is less expensive, more easily made, more readily formed to any desired shape, and because it possesses a superior compactness, firmness, resilience, and flexibility.

Much difficulty has heretofore been experienced with deterioration of welts and analogous trimming moldings, particularly the cores and fillers thereof, on exposure to weather. Such exposure commonly results in rotting of the material and eventual breaking down of the whole structure. My present invention provides a core or filler which is thoroughly and permanently waterproof and which consequently provides a durable and unchangeable foundation for permanently sustaining the covering and other trimming molding elements.

An important quality of any trimming molding element is its capacity to be disposed about curves of short radius without objectionable puckering and buckling and without imparting kinks and similar deformations to the molding as a whole. My present core possesses these smooth bending properties to a high degree, and welts which include it are capable of being disposed about short curves in the flat plane of the welt without appreciable puckering, buckling or kinking.

A further advantage of the present invention is the capacity of cores or fillers made according to it to be built up to any thickness desired, between any limits usual in trimming molding practice. As will be seen hereinafter, the structure comprises a filler or core made of fabric plies, and a body of any desired thickness is produced by using the material in any appropriate number of plies.

With the foregoing and other objects and advantages in view, my invention comprises a construction of which a preferred form is shown on the accompanying drawing and also explained hereinafter.

In the drawing,

Figure 1 shows a sheet of material, a portion of the sheet being shown as treated in accordance with a preliminary step in the manufacture of the core;

Fig. 2 is a perspective view of the treated sheet with one of its margins folded over in conformity with an intermediate step in the manufacture of the core;

Fig. 3 is a cross sectional view of a completed core;

Fig. 4 is a perspective view thereof;

Fig. 5 is a cross sectional view of a modified, completed core; and

Fig. 6 is a similar view of a further modified, completed core.

Broadly, the invention comprises a core of the class described which is formed of a strip of coarse fabric, such as jute burlap impregnated with an adhesive composition, folded over on itself to provide two or more plies, enough to give the resulting body the thickness desired. Thus, for example, the core may comprise such a strip having both of its marginal portions folded over the central zone of the strip and moderately compacted together, so that the resulting structure is of three-ply thickness throughout most of its width, as shown in Figs. 3 and 4. After the adhesive has begun to set the completed core comprises a substantially unitary body, the several plies and the plurality of threads being firmly bonded together. Use of a preferred type of adhesive composition results in the surface of the completed core remaining comparatively tacky or being frictioned, for a considerable period of time, whereby the conventional trimming molding covering material is adapted firmly to bond with the core so that relative sliding movement of the core and covering is prevented.

I form my novel core or filler by providing jute burlap or analogous coarse fabric in a strip of indefinite length and approximately, in the case of the example chosen for illustration in Figs. 2, 3, and 4, three times the width desired for the completed core. The strip, shown at 1 in Fig. 1, is coated and preferably thoroughly impregnated with an adhesive filler composition as indicated at 2 in Fig. 1.

While the adhesive composition is still tacky and comparatively fluid one side margin 3 of the strip is folded over onto the central zone of the strip, and thereafter the other side margin 4 is folded over onto the side margin 3. The width of each folded-over side margin is so proportioned that the extreme edge of the strip material does not extend quite to the extreme edge of the core. It results, as clearly shown in Figs. 3 and 4, that the extreme edges of the core are two plies in thickness, while the greater part of the central area of the core is of three ply thickness. By this construction the impregnated material of the core is readily compacted and formed to provide a body which is substantially half-round or semi-cylindrical, i. e., substantially thinner at its edges than in its center. The final step in the manufacture of the core is a compacting operation by which the impregnated fibers of the core material are consolidated and are permanently held in compacted condition by the setting of the adhesive.

The adhesive which I prefer to use is a latex compound, but obviously any other fluid or viscous medium having the desired properties may be substituted.

In Figs. 5 and 6 I show modifications of the specific form of core just explained. In Fig. 5 the structure is relatively thin, being of two-ply thickness, and is the type of element generally used as a filler strip in welt manufacturing. In Fig. 6 the structure is comparatively thick, and is adapted to serve as the core of a molding or as the filler of the large bead of a welt. It will be appreciated that these two modifications, and of course others which it is not necessary to describe herein, embody the broad principles of the invention as explained hereinabove.

It will be noted that in Fig. 6 I show certain of the interior plies, designated by the reference numeral 5, as being formed of separate strips of material. This modification is of course within the broad spirit of the invention. In other words, I have found that the adhesive which I prefer to use is capable of bonding together independent, separate strips of material to make up of them a solid, effectively integral body. I am thus able to use the otherwise wasted selvage edges of various piece goods to make cores or fillers according to the principles of this invention. I show separate strips forming certain of the plies in Fig. 6 merely to illustrate this feature of the invention. Obviously the plies in Fig. 6 might equally well be constituted by the various folds of a single piece of material; and similarly the several plies in the other figures might be made of separate strips of material.

I have found that cores made as explained above cost very little, can be formed during their manufacture into any of the several conventional core shapes now in use, and can be associated with a trimming molding covering strip without requiring the use of any additional adhesive. That is to say, even after lapse of a considerable period of time, my novel core or filler may be associated with any usual type of trimming molding covering material, and will stick thereto by virtue of the tacky or frictioned character of the core surface.

The foregoing explanation has been by way of exemplification and not limitation, showing certain types of construction and specifying certain materials which I have found satisfactory and which comprise the best mode now known to me of practicing the invention to provide a highly flexible core or filler strip having all the advantages explained herein. It is to be understood that the broad principles of the invention are of wide application and that other and further embodiments are contemplated and, to the extent that such modifications embody the principles of the invention as pointed out by the appended claims, they are to be deemed within the scope and purview thereof.

I claim:

1. A core for trimming moldings and the like comprising a relatively thick strip of coarse textile material such as burlap impregnated with an adhesive composition having each of its opposite margins folded over the central zone of the strip to provide three plies, the several plies being consolidated into a unitary body by the adhesive, and the adhesive composition penetrating the several plies and coating the outer surfaces of the body.

2. A core for trimming moldings and the like comprising a relatively thick strip of relatively coarse, open mesh textile material impregnated with an adhesive filler and having one of its margins folded over onto the central zone of the strip and the other margin folded over onto the first margin to provide a three-ply structure, the several plies being consolidated into a unitary body by the adhesive filler, and said filler penetrating the several plies and coating the outer surfaces of the body.

3. A core for trimming moldings and the like comprising a relatively thick strip of relatively coarse, open mesh textile material impregnated with an adhesive filler and having one of its margins folded over onto the central zone of the strip and the other margin folded over onto the first margin to provide a three-ply structure, the several plies being consolidated by the filler into a unitary body and the adhesive compound penetrating the plies and coating the outer surfaces of the body to form a friction surface adapted to engage conventional trimming molding covering material and hold the same against relative sliding movement.

4. A core as claimed in claim 3 in which the textile material is burlap and the adhesive is rubber deposited from latex.

5. A core for trimming moldings and the like comprising a relatively thick strip of relatively coarse, open mesh textile material impregnated with an adhesive filler and having one of its margins folded over onto the central zone of the strip and the other margin folded over onto the first margin to provide a three-ply structure, the several plies being consolidated into a unitary body by the adhesive filler and the free edges of said marginal portions being disposed inwardly of the edges of the structure whereby the body is of two-ply thickness along its edges and of three-ply thickness along its central zone.

6. A core as claimed in claim 5 in which the edges of the body are pressed relatively thin and the central zone of the body is left relatively thick so that the core is of substantially half-round or semi-cylindrical shape.

WILLIAM JOHN MacLEOD.